US012588786B2

(12) United States Patent
Detlaff

(10) Patent No.: US 12,588,786 B2
(45) Date of Patent: *Mar. 31, 2026

(54) SINK ACCESSORY SYSTEM

(71) Applicant: Kohler Co., Kohler, WI (US)

(72) Inventor: Ryan Detlaff, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,228

(22) Filed: Dec. 12, 2023

(65) Prior Publication Data

US 2024/0108180 A1 Apr. 4, 2024

Related U.S. Application Data

(63) Continuation of application No. 17/681,090, filed on Feb. 25, 2022, now Pat. No. 11,857,119.

(60) Provisional application No. 63/160,274, filed on Mar. 12, 2021.

(51) Int. Cl.
*A47J 47/20* (2019.01)
(52) U.S. Cl.
CPC .................................... *A47J 47/20* (2013.01)
(58) Field of Classification Search
CPC ............. A47J 47/20; E03C 1/18; E03C 1/186
USPC ........... 4/656, 657, 658, 660, 654, 520, 637;
34/238; 108/4; 211/41, 86, 126
See application file for complete search history.

(56) References Cited

U.S. PATENT DOCUMENTS

| | | | | |
|---|---|---|---|---|
| 8,156,580 B1 * | 4/2012 | Paone | ..................... | E03C 1/186 |
| | | | | 4/654 |
| 9,574,333 B2 * | 2/2017 | O'Brien | ................ | A47J 47/005 |
| D784,696 S * | 4/2017 | Chong | ........................... | D3/304 |
| 10,329,755 B2 * | 6/2019 | Zver | ......................... | E03C 1/33 |
| 10,501,919 B2 * | 12/2019 | Chong | .................... | E03C 1/335 |
| 10,588,483 B2 * | 3/2020 | Keller | ..................... | A47L 19/02 |
| 11,857,119 B2 * | 1/2024 | Detlaff | ...................... | E03C 1/18 |
| 2010/0275369 A1 * | 11/2010 | Eilmus | .................. | A47J 47/005 |
| | | | | 4/631 |
| 2013/0241127 A1 * | 9/2013 | Yang | ...................... | A47J 47/005 |
| | | | | 269/15 |
| 2019/0264432 A1 * | 8/2019 | Zver | ........................ | A47J 47/20 |
| 2020/0277769 A1 * | 9/2020 | Chong | .................. | E03C 1/0404 |

FOREIGN PATENT DOCUMENTS

| | | | | |
|---|---|---|---|---|
| CN | 112982584 A * | 6/2021 | | |
| DE | 10 2015 122 606 B4 | 5/2022 | | |
| WO | WO-2006064771 A1 * | 6/2006 | ............... | C09D 1/00 |

* cited by examiner

*Primary Examiner* — Lori L Baker
(74) *Attorney, Agent, or Firm* — Husch Blackwell LLP

(57) ABSTRACT

A sink accessory configured to provide functional space within a sink includes a first end, a second end opposite the second end, and a work space defined between the first end and the second end. The first end and the second end are configured to respectively engage with a first wall and a second wall of a sink to wedge the sink accessory between the first wall and second wall of the sink. Another aspect of the present disclosure relates to a sink accessory system that includes a sink having a first wall and a second wall opposing the first wall, and at least one sink accessory wedged within the sink.

18 Claims, 4 Drawing Sheets

SINK ACCESSORY SYSTEM

CROSS-REFERENCE TO RELATED APPLICATIONS

This application is a continuation of U.S. application Ser. No. 17/681,090, filed Feb. 25, 2022, which claims the benefit and priority to U.S. Provisional Application No. 63/160,274, filed Mar. 12, 2021, the entire disclosures of which are hereby incorporated by reference in their entirety.

BACKGROUND

The present application relates generally a sink accessory, and more specifically to a sink accessory that is configured to wedge within opposing sink walls to allow for positioning within the basin of the sink while being elevated above a lower surface of such sink.

SUMMARY

According to one aspect of the present disclosure, a sink accessory configured to be positioned within a sink incudes a first end, a second end opposite the first end, and a work space defined between the first end and the second end. The first end and the second end are configured to respectively engage with a first wall and a second wall of a sink to wedge the sink accessory between the first wall and second wall of the sink.

In various embodiments, the first end has a first draft angle and the second end has a second draft angle. In some embodiments, the first wall and the second wall are respectively sloped at a third draft angle and a fourth draft angle. In other embodiments, the first and second draft angles are within a predetermined tolerance amount of the third and fourth draft angles. In various embodiments, the sink accessory is configured to be at least one of a wash bin, strainer, colander, or storage bin. In some embodiments, the sink accessory has a first width defined between the first end and the second end, and wherein the sink has a second width defined between the first wall and the second wall. In other embodiments, the first width is within a predetermined tolerance amount of the second width. In yet other embodiments, at least one of the first end and the second end includes an elastic material to facilitate a flexible wedge fit within the sink.

Another aspect of the present disclosure relates to a sink accessory system including at least one sink having a first wall and a second wall opposing the first wall and a sink accessory wedged within the sink. The sink accessory includes a first end, a second end opposite the first end, and a functional region defined between the first end and the second end. The first end and the second end are configured to respectively engage with the first wall and the second wall to wedge the sink accessory within the sink.

In various embodiments, the sink accessory system includes a first sink accessory and a second sink accessory. In some embodiments, the first end and the second end of the first sink accessory respectively have a first draft angle and a second draft angle, and wherein the first end and the second end of the second sink accessory respectively have a third draft angle and a fourth draft angle. In other embodiments, the first and second draft angles are smaller than the third and fourth draft angles. In yet other embodiments, the first sink accessory has a first function and the second sink accessory has a second function, and wherein the first function is different than the second function. In various embodiments, the first sink accessory is disposed at a first height within the sink and the second sink accessory is disposed at a second height within the sink, and wherein the first height is smaller than the second height. In some embodiments, the at least one sink accessory has a first width defined between the first end and the second end, and wherein the sink has a second width defined between the first wall and the second wall. In other embodiments, the first width is within a predetermined tolerance amount of the second width. In yet other embodiments, at least one of the first end and the second end of the at least one sink accessory includes an elastic material to facilitate a flexible wedge fit within the sink. In some embodiments, at least one of the first end and the second end of the at least one sink accessory includes a coating to increase a coefficient of friction with at least one of the first wall or the second wall. In other embodiments, a draft angle of the first end of the at least one sink accessory is greater than a draft angle of the second end. In yet other embodiments, at least one of the first end or the second of the at least one sink accessory includes at least one of a strip or a ridge, the strip or ridge configured to form a friction fit between the at least one sink accessory and the sink.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
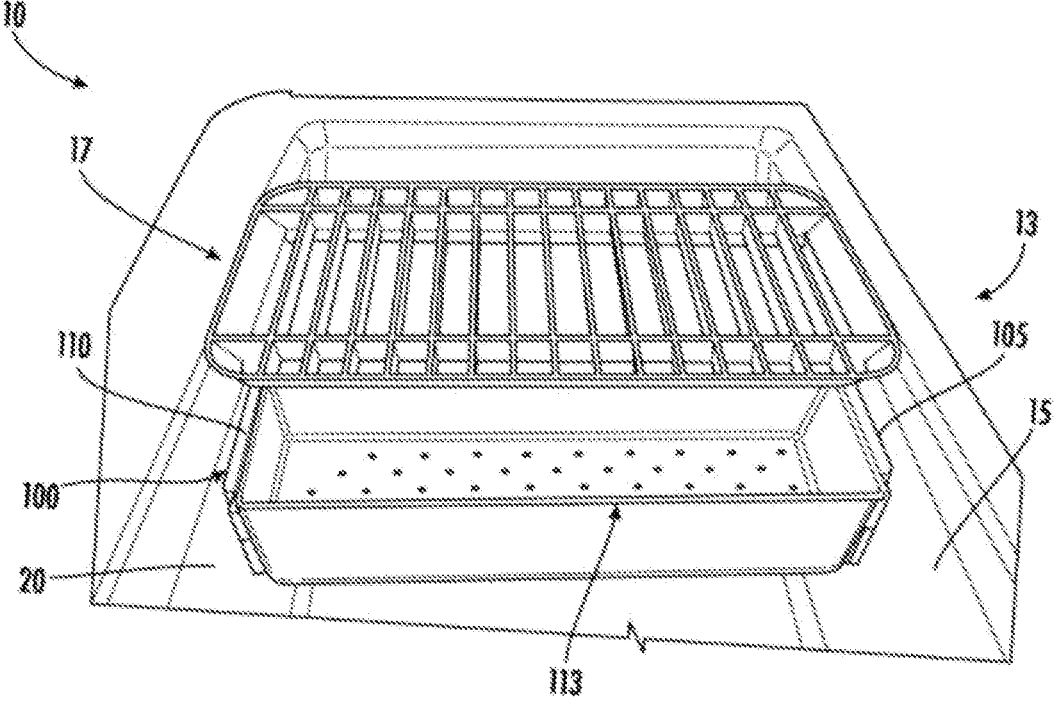
FIG. 1 is a perspective view of a sink accessory system, according to an exemplary embodiment.
Figure 2:
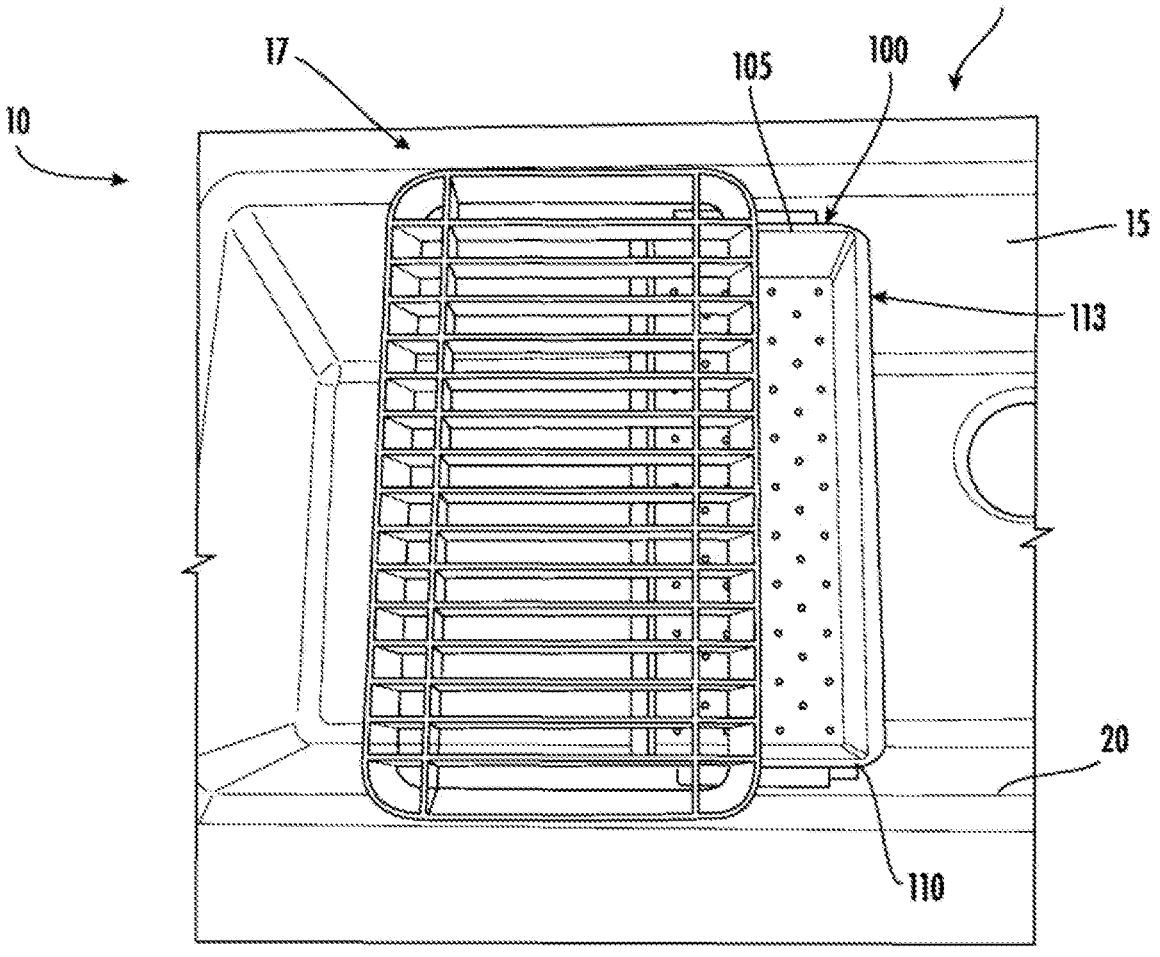
FIG. 2 is a top view of the sink accessory system of FIG. 1.

Referring to FIGS. 1-2, a sink accessory system 10 is shown, according to an exemplary embodiment. The sink accessory system 10 includes a sink 13 having a sink area defined by at least a first wall 15 and an opposing second wall 20. The sink 13 may be a top mounted (e.g., self-rimming or drop-in), an under mounted, a flush mounted, a bar or preparation type, apron-front, or any other sink type known in the art. The first wall 15 and the second wall 20 may be each disposed adjacent one or more additional sink walls, rims, edges, or any other sink features known in the art. The sink accessory system 10 includes at least one sink accessory 100. The sink accessory 100 is configured to wedge within the sink 13 to create an additional functional level available to a user, without requiring added features or geometries within the sink 13 (e g., brackets, fasteners, etc.). A functional level may be considered as a spatial level or space within the sink area that a user may use for one or more functions.

As shown, the sink accessory 100 includes a first end 105 and a second end 110, which is disposed opposite the first end 105. Each of the first end 105 and the second end 110 may define walls or sides, which define a functional region or work space 113 disposed therebetween. The first end 105 of the first sink accessory 100 is configured to engage with the first wall 15 of the sink 13 and the second end 110 of the first sink accessory 100 is configured to engage with the second wall 20 of the sink 13. In various embodiments, the sink accessory 100 is configured to facilitate one or more functional tasks within the sink area. In various embodiments, the functional region or work space 113 may include at least one of a cutting board, colander, strainer, utility rack, basket, storage container, wash bin, drying rack, etc.

Figure 3:
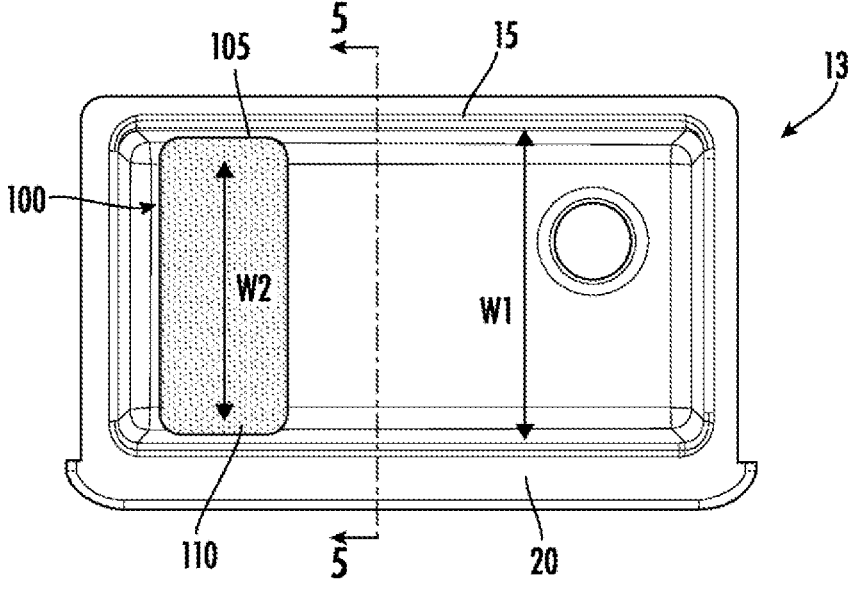
FIG. 3 is a top view of a sink accessory disposed within a sink, according to an exemplary embodiment.

FIG. 3 shows a top view of sink accessory 100 wedged within the sink 13. As shown, the sink 13 has a width W1 defined between the opposing first wall 15 and the second wall 20. Similarly, the sink accessory 100 has a width W2 defined between the first end 105 and the second end 110, wherein W2 is smaller than WE The sink accessory 100 is configured such that the first end 105 and the second end 110 respectively engage with the first wall 15 and the second wall 20 of the sink 13 to wedge the accessory 100 therebetween. In various embodiments, the sink accessory 100 may be made of a flexible or elastic material including, but not limited to, one or more polymers, plastics, metals, composites, or a combination thereof.

Figure 4:
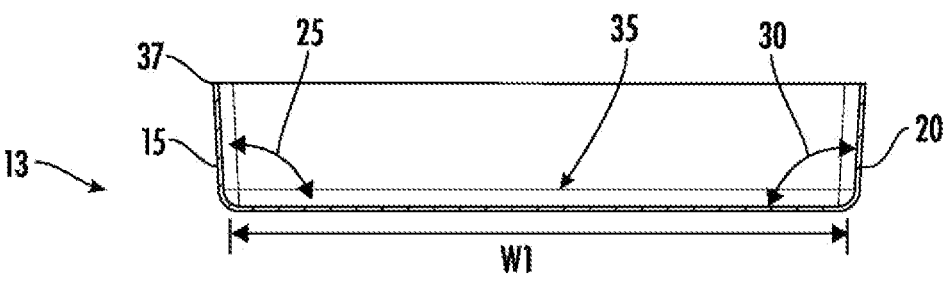
FIG. 4 is a side view of the sink of FIG. 3.

FIG. 4 shows a side view of the sink 13, according to an exemplary embodiment. As shown, the first wall 15 and second wall 20 of the sink 13 are sloped at angles 25 and 30 (i.e., draft angles), respectively. Accordingly, the width W1 of the sink 13 may be smaller nearest a bottom surface 35 of the sink 13 and greatest nearest an upper edge or rim 37 of the sink 13. Consequently, the sink accessory 100 may be placed in the sink 13 such that the first and second ends 105, 110 may wedge between the sloped first and second walls 15, 20 without the aid of mounting features within the sink including, but not limited to, ledges, ridges, lips, brackets, bevels, etc. Because the sink accessory 100 wedges between the opposing walls 15, 20 of the sink 13, the sink accessory 100 may be positioned at a height above the bottom surface 35 of the sink 13 to provide additional function space for a user.

Because the sink accessory 100 is held in place within the sink 13 by a wedge fit between the ends 105, 110 and the walls 15, 20, the angles 25 and 30 of the sink walls 15, 20 determine a vertical position of the sink accessory 100 within the sink 13. To facilitate a secure wedge fit within the sink 13, each of the first end 105 and the second end 110 of the sink accessory 100 may be drafted (i.e., may be sloped or angled) such that the first end 105 has a draft angle 125 and the second end has a second draft angle 130. Accordingly, the sink accessory 100 may be wedged in a vertical position such that the sink accessory 100 is closer to an upper edge or rim 37 of the sink 13 than to the bottom surface 35 of the sink 13 if the angles 25, 30 are greater than the angles 125, 130. Similarly, the sink accessory may be wedged in a vertical position such that the sink accessory 100 is closer to the upper edge or rim 37 of the sink 13 than to the bottom surface 35 of the sink 13 if the angles 25, 30 are smaller than angles 125, 130. Furthermore, the sink accessory 100 may be sized such that the width W2 may enable wedging of the sink accessory 100 within the sink 13. The height of the sink accessory 100 when wedged within the sink 13 is based on the width W2 of the sink accessory 100 relative to the width W1 of the sink 13, and based on the angles 125, 130 of the sink accessory 100 relative to the angles 25, 30. In various embodiments, depending on the angles 125, 130 and the width W2, the sink accessory 100 may be positioned within the sink 13 such that an upper edge of the sink accessory 100 is substantially parallel to or lower than the upper edge 37 of the sink 13 In other embodiments, depending on the angles 125, 130 and the width W2, the sink accessory 100 may be positioned within the sink 13 such that an upper edge of the sink accessory 100 is vertically higher than the upper edge 37 of the sink 13. Accordingly, the sink accessory 100 may be adaptable to a variety of types of the sink 13 having various widths W1 and angles 25, 30 respectively associated with side walls 15, 20. In various embodiments, the angles 125, 130 associated with ends 105, 110 of the sink accessory 100 and/or the angles 25, 30 associated with the walls 15, 20 of the sink 13 may range from approximately 3 degrees to approximately 5 degrees.

Figure 5:
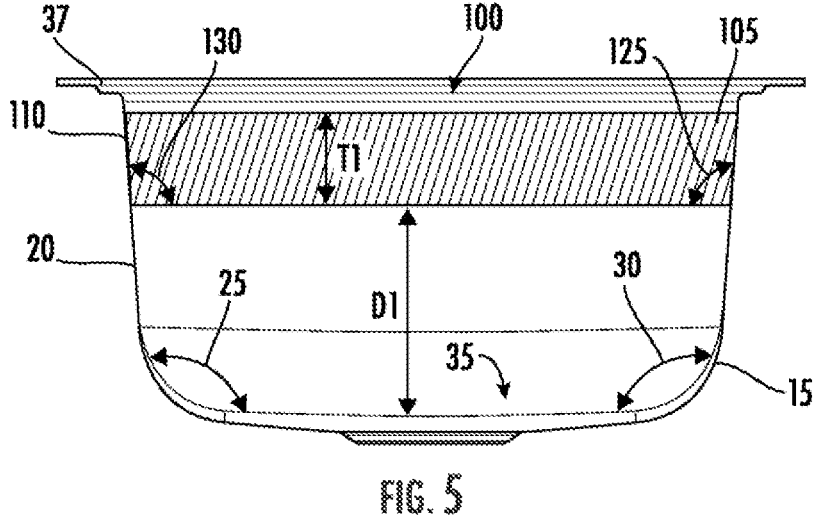
FIG. 5 is a side cross-sectional view of a first sink accessory disposed within the sink of FIG. 3, taken along line 5-5 of FIG. 3, according to an exemplary embodiment.
Figure 6:
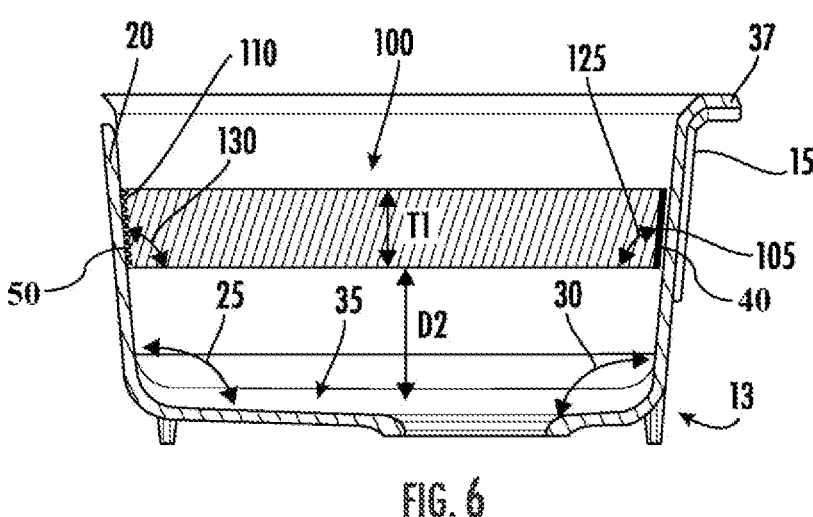
FIG. 6 is a side cross-sectional view of a second sink accessory disposed within the sink of FIG. 3, taken along line 5-5 of FIG. 3, according to another exemplary embodiment.

FIGS. 5 and 6 show side cross-sectional views taken along line 5-5 of FIG. 3 of the sink accessory 100 wedged within the sink 13, according to various exemplary embodiments. As shown in FIG. 5, the sink accessory 100 may be wedged within the sink 13 at a distance DI from the bottom surface 35 of the sink 13 in a case where the width W2 and angles 125, 130 of the ends 105, 110 are such that the sink accessory 100 is disposed closer to the upper edge 37 than to the bottom surface 35 of the sink 13. In another embodiment, as shown in FIG. 6, the width W2 and angles 125, 130 of the ends 105, 110 may be such that the sink accessory 100 is disposed a distance D2 from the bottom surface 35, wherein the sink accessory 100 is spaced a distance from the upper edge 37 and is thus closer to the bottom surface 35.

In various embodiments, the sink accessory 100 may include one or more features disposed at either or both of the first and second ends 105, 110 to increase a coefficient of friction (i.e., to prevent slipping, lateral movement within the sink, etc.) between the sink accessory 100 and the walls 15, 20 of the sink 13. Such features may include but are not limited to high friction coatings or portions having one or more strips or ridges made of a high friction material (e.g., silicone, rubber, etc.), which may engage with the walls 15, 20 to facilitate a friction fit of the sink accessory 100 within the sink 13. In various embodiments, a thickness Tl, defined between a bottom surface and an upper edge of the sink accessory 100, may be based on a desired function of the sink accessory 100. In other embodiments, the thickness Tl may be adjustable (e g., to suit a particular function, to fit the sink 13, etc.). In some embodiments, at least one of the width W2 and the angles 125, 130 associated with the ends 105, 110 of the sink accessory may be based on the desired function of the sink accessory 100. In other embodiments, at least one of the width W2 and the angles 125, 130 associated with the ends 105, 110 of the sink accessory 100 may be adjustable (e.g., to suit a particular function, to fit the sink 13, etc.).

As previously described, the sink accessory may be made of or may include one or more metallic, non-metallic, polymeric, composite, and/or other suitable materials. In various embodiments, the sink accessory 100 may be configured such that the ends 105, 110 are flexible and may elastically form a wedge between the walls 15, 20 of the sink 13. In various embodiments, the draft angle 125 of the first end 105 of the sink accessory 100 may be the same as the draft angle 130 of the second end 110 of the sink accessory 100. In other embodiments, the draft angle 125 may be greater than or less than the draft angle 130 (i.e., such that the sink accessory 100 may be positioned at an incline between the walls 15, 20). In various embodiments, at least one of the draft angle 125 and the draft angle 130 may be within a predetermined range or tolerance of the angles 25, 30 associated with the walls 15, 20 of the sink 13. In some embodiments, the sink accessory 100 may be configured such that the first end 105 having the first draft angle 125 may have a first amount of flexibility and the second end 110 having the second draft angle 130 may have a second amount of flexibility. Accordingly, the sink accessory 100 may be flexibly adjustable to fit within a range of widths W1 and/or draft angles 25, 30 associated with the sink 13.

During use, the sink accessory 100 may be used to provide additional functional space in a sink area by wedging the sink accessory 100 between opposing walls 15, 20 of the sink 13. In various implementations, the sink accessory 100 may be used with one or more additional sink accessories or tools, such as a sink accessory 17, which is shown in FIGS. 1 and 2. As illustrated, the sink accessory 100 may be configured to wedge within the sink 13 at distance below the upper edge of the sink 13 such that the sink accessory 17 may be placed at a height above the sink accessory 100. Accordingly, the sink accessory 100 may enable a user to create multiple functional levels or spaces within the sink area. For example, the sink accessory 100 may be a wash bin or a storage bin wedged a distance below the sink accessory 17, which may be a cutting board or a drying rack.

In various embodiments, multiple sink accessories 100 may be wedged within the sink 13 to created multiple functional levels or spaces therein. For example, a sink accessory system 10 may include a first sink accessory having a first width may be wedged within the sink 13 near the bottom surface 35 (e.g., at a distance D2) and a second accessory having a second width greater than the first width may be wedged within the sink 13 near the upper edge 37 (e.g., at a distance DI). In various embodiments, a first sink accessory and a second sink accessory may be wedged within the sink 13 at a same height such that the first sink accessory and the second sink accessory may be adjacently positioned within the sink 13. In other embodiments, first and second sink accessories may be wedged within the sink 13, wherein the first sink accessory has a first thickness and the second sink accessory has a second thickness different than the first thickness. In yet other embodiments, first and second sink accessories may be wedged within the sink 13, wherein the first sink accessory has first and second draft angles associated with its respective first and second ends, and the second sink accessory has third and fourth draft angles associated with its respective first and second ends, wherein the first and second draft angles are greater than or smaller than the third and fourth draft angles. In various embodiments, a sink accessory system may include a first sink accessory configured to have a first function (e.g., colander, strainer, utility rack, drying rack, wash bin, storage bin, cutting board, etc.) and a second sink accessory having a second function, which may be the same as or different than the first function. For example, a sink accessory system 10 may include a first sink accessory configured as a wash bin and a second sink accessory configured as a drying rack.

Notwithstanding the embodiments described above and shown in FIGS. 1-6, various modifications and inclusions to those embodiments are contemplated and considered within the scope of the present disclosure.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the multiple sink accessories of the exemplary embodiment described may be incorporated in the sink 13 of another exemplary embodiment. Although only one example of an element from one embodiment that can be incorporated or utilized in another embodiment has been described above, it should be appreciated that other elements of the various embodiments may be incorporated or utilized with any of the other embodiments disclosed herein.

What is claimed:

1. A sink accessory comprising:
a first edge having a first draft angle;
a second edge having a second draft angle; and
a work space defined between the first and second edges;
wherein the first and second edges are configured to wedge the sink accessory within a sink.

2. The sink accessory of claim 1, wherein each of the first and second edges define a wall or a side.

3. The sink accessory of claim 1 wherein a first wall and a second wall are respectively sloped at a third draft angle and a fourth draft angle and the first and second edges are configured to respectively engage with the first wall and the second wall.

4. The sink accessory of claim 3, wherein the first and second draft angles are within a predetermined tolerance amount of the third and fourth draft angles.

5. The sink accessory of claim 3, wherein the sink accessory has a first width defined between the first end and the second end, and wherein the sink has a second width defined between the first wall and the second wall.

6. The sink accessory of claim 5, wherein the first width is within a predetermined tolerance amount of the second width.

7. The sink accessory of claim 1, wherein the sink accessory is configured to be at least one of a cutting board, utility rack, wash bin, strainer, colander, or storage bin.

8. The sink accessory of claim 1, wherein at least one of the first edge and the second edge comprises an elastic material to facilitate a flexible wedge fit within the sink.

9. A sink accessory comprising a workspace defined between first and second angled edges, wherein the sink accessory is configured to engage walls of a sink at a height below a rim of the sink and above a bottom surface of the sink.

10. The sink accessory of claim 9, the sink accessory having a first width defined between the first angled edge and the second angled edge, and wherein the sink has a second width defined between the walls.

11. The sink accessory of claim 10, wherein the first width is within a predetermined tolerance amount of the second width.

12. The sink accessory of claim 9, wherein at least one of the first angled edge and the second angled edge comprises an elastic material to facilitate a flexible wedge fit within the sink.

13. The sink accessory of claim 9, wherein at least one of the first angled edge and the second angled edge comprises a coating to increase a coefficient of friction with at least one of the sink walls.

14. The sink accessory of claim 9, wherein a draft angle of the first angled edge of the sink accessory is greater than a draft angle of the second end.

15. The sink accessory of claim 9, wherein at least one of the first angled edge or the second angled edge comprises at least one of a strip or a ridge, the strip or ridge configured to form a friction fit between the one sink accessory and the sink.

16. A sink accessory configured to be positioned within a sink, the sink accessory comprising:
a first edge having a first draft angle;
a second edge opposite the first edge, the second edge having a second draft angle;
a work space defined between the first edge and the second edge; and
a first width defined between the first edge and the second edge, wherein the sink has a second width defined between a first wall of the sink and a second wall of the sink,
wherein the first edge and the second edge are configured to respectively engage with the first wall of the sink and the second wall of a sink to wedge the sink accessory between the first wall and the second wall without the aid of mounting features within the sink to create functional space within the sink,
wherein each of the first edge and the second edge define a wall or a side,
wherein the first wall of the sink and the second wall of the sink are respectively sloped at a third draft angle and a fourth draft angle and the first and second edges are configured to respectively engage with the first wall of the sink and the second wall of the sink,
wherein the first and second draft angles are within a predetermined tolerance amount of the third and fourth draft angles,
wherein the sink accessory is at least one of a cutting board, utility rack, wash bin, strainer, colander, drying rack, or storage bin.

17. The sink accessory of claim 16, further comprising one or more features disposed at either or both of the first edge and the second edge configured to increase a coefficient of friction between the sink accessory and the first wall of the sink or the second wall of the sink, so as to prevent slipping or other movement within the sink, the one or more features comprising one or more of a high friction coating, silicone, rubber, or a high friction material, the one or more features configured to facilitate a friction fit of the sink accessory within the sink.

18. The sink accessory of claim 16, wherein the first width of the sink accessory is adjustable.

* * * * *